US010996950B2

(12) United States Patent
den Besten et al.

(10) Patent No.: US 10,996,950 B2
(45) Date of Patent: May 4, 2021

(54) APPARATUSES AND METHODS INVOLVING SELECTIVE DISABLEMENT OF SIDE EFFECTS CAUSED BY ACCESSING REGISTER SETS (71) Applicant: NXP B.V., Eindhoven (NL)

(72) Inventors: Gerrit Willem den Besten, Eindhoven (NL); Martijn Martinus Hendrikus van der Cruijsen, Wanroij (NL)

(73) Assignee: NXP B.V., Eindhoven (NL)

( * ) Notice: Subject to any disclaimer, the term of this patent is extended or adjusted under 35 U.S.C. 154(b) by 119 days.

(21) Appl. No.: 16/456,467

(22) Filed: Jun. 28, 2019

(65) Prior Publication Data

US 2020/0409706 A1 Dec. 31, 2020

(51) Int. Cl.
*G06F 9/30* (2018.01)
*G06F 13/42* (2006.01)

(52) U.S. Cl.
CPC ...... *G06F 9/30101* (2013.01); *G06F 13/4282* (2013.01); *G06F 9/30043* (2013.01)

(58) Field of Classification Search
CPC .................... G06F 9/30043; G06F 9/30101
See application file for complete search history.

(56) References Cited

U.S. PATENT DOCUMENTS

| 5,598,545 | A | 1/1997 | Childers et al. |
| 5,603,013 | A | 2/1997 | Ohara |
| 6,215,816 | B1 * | 4/2001 | Gillespie ................ H04L 12/44 370/402 |
| 7,511,530 | B1 | 3/2009 | Cox et al. |
| 8,631,483 | B2 | 1/2014 | Soni et al. |
| 9,083,784 | B2 | 7/2015 | Ku et al. |
| 9,455,713 | B1 | 9/2016 | Kadkol |
| 10,747,538 | B2 | 8/2020 | Mouchel La Fosse et al. |
| 2002/0124007 | A1 | 9/2002 | Zhao |
| 2011/0096930 | A1 | 4/2011 | Walmsley |
| 2013/0002290 | A1 | 1/2013 | Gondi et al. |
| 2013/0106491 | A1 | 5/2013 | Ryu |
| 2014/0181845 | A1 | 6/2014 | Jing et al. |
| 2019/0104088 | A1 | 4/2019 | Qin et al. |
| 2019/0205244 | A1 | 7/2019 | Smith |
| 2019/0361708 | A1 * | 11/2019 | Soe .................. G06F 9/30101 |
| 2020/0201637 | A1 | 6/2020 | Mouchel La Fosse et al. |
| 2020/0272474 | A1 * | 8/2020 | Gabor ................ G06F 9/30101 |
| 2020/0409884 | A1 | 12/2020 | den Besten |

(Continued)

FOREIGN PATENT DOCUMENTS

JP 2015 035780 A 2/2015

OTHER PUBLICATIONS

Final Rejection for U.S. Appl. No. 16/456,111, 15 pgs., (dated Nov. 30, 2020).

(Continued)

*Primary Examiner* — Zachary K Huson
(74) *Attorney, Agent, or Firm* — Rajeev Madnawat (57) ABSTRACT An example an apparatus includes a register set, data access circuitry, and configuration circuitry. The register set includes at least one addressable register to store data and to manifest a side effect in response to the at least one addressable register being accessed. The data access circuitry accesses the register set, which may cause the side effect, and the configuration circuitry selectively disables the side effect.

20 Claims, 5 Drawing Sheets (56) References Cited

U.S. PATENT DOCUMENTS

2020/0409976 A1    12/2020   den Besten
2020/0412368 A1    12/2020   den Besten
2020/0412572 A1    12/2020   den Besten

OTHER PUBLICATIONS

Notice of Allowance for U.S. Appl. No. 16/457,287, 7 pgs. (dated Nov. 27, 2020).
Notice of Allowance for U.S. Appl. No. 16/456,236, 9 pgs. (dated Dec. 4, 2020).
Non-Final Rejection for U.S. Appl. No. 16/456,111, 15 pgs. (dated Aug. 24, 2020).
Non-Final Rejection for U.S. Appl. No. 16/457,287, 6 pgs. (dated Nov. 13, 2020).
U.S. Appl. No. 16/456,111, filed Jun. 28, 2019, entitled: Apparatuses and Methods Involving First Type of Transaction Registers Mapped to Second Type of Transaction Addresses. The Examiner is referred to the copending patent prosecution of the common Applicant (no attachment).
U.S. Appl. No. 16/456,206, filed Jun. 28, 2019, entitled: Apparatuses and Methods Involving Synchronization Using Data in the Data/Address Field of a Communications Protocol. The Examiner is referred to the copending patent prosecution of the common Applicant (no attachment).
U.S. Appl. No. 16/457,287, filed Jun. 28, 2019, entitled: Apparatuses and Methods Involving Disabling Address Pointers. The Examiner is referred to the ;wending patent prosecution of the common Applicant (no attachment).
U.S. Appl. No. 16/456,236, filed Jun. 28, 2019, entitled: Apparatuses and Methods Involving a Segmented Source-Series Terminated Line Driver. The Examiner is referred to the copending patent prosecution of the common Applicant (no attachment).
IEEE Standard for Ethernet, IEEE 802.3-2018, Clauses 22 and 45 (abstract only).
Open Alliance, TC10 Wake-up and Sleep Specification for Automotive Ethernet.
Yue Lu, Kwangmo Jung, Yasuo Hidaka, Elad Alon, "Design and Analysis of Energy-Efficient Reconfigurable Pre-Emphasis Voltage-Mode Transmitters," in IEEE Journal of Solid-State Circuits, vol. 48, No. 8, Aug. 2013 (abstract only).
Notice of Allowance for U.S. Appl. No. 16/456111, 20 pgs. (dated Feb. 19, 2021).
Notice of Allowance for U.S. Appl. No. 16/457,287, 6 pgs. (dated Mar. 3, 2021).

* cited by examiner

APPARATUSES AND METHODS INVOLVING SELECTIVE DISABLEMENT OF SIDE EFFECTS CAUSED BY ACCESSING REGISTER SETS

OVERVIEW

Aspects of various embodiments are directed to selectively disabling side effects caused by register set accesses.

Local area networks (LANs) are a means by which many network modules or work stations are interconnected so as to share resources such as data and applications, providing considerable cost savings over, for example, a mainframe computer with multiple attached terminals, and providing other benefits as well. An example LAN arrangement is the so-called "Ethernet" LAN, which is defined by an industry compliant standard, namely, the Institute of Electrical and Electronic Engineer (IEEE) 802.3 standard. This standard allows network devices of various manufacturers, such as network interface cards (NICs), hubs, bridges, routers, and switches, to communicate packetized data with each other in the LAN. The IEEE 802.3 standard is defined in terms of the Open Systems Interconnection (OSI) reference model. This model defines a data communication system in terms of layers. Among the layers included in the OSI model are: (1) the physical layer (PHY), which specifies the electrical and coding characteristics of the transmission medium; (2) the medium access control (MAC) layer, which controls flow of data through the network; and (3) the network layer, which sets up connections between sources and destinations for data communicated in the network. Other layers include the transport layer, which is a protocol stack for transporting the data, and the application layer, such as a word-processor or spread sheet application.

These and other matters have presented challenges to efficiencies of register implementations, for a variety of applications.

SUMMARY

Various example embodiments are directed to issues such as those addressed above and/or others which may become apparent from the following disclosure concerning disabling side effects caused by register set accesses.

In certain example embodiments, aspects of the present disclosure involve selectively disabling subsets of side effects due to multiple accesses of the register set by a plurality of register interfaces.

In a more specific example embodiment, an apparatus includes a register set, data access circuitry, and configuration circuitry. The register set includes at least one addressable register to store data and to manifest a side effect in response to the at least one addressable register being accessed. The side effect includes the stored data in the at least one addressable register that is changed in response to a read-type access or a write-type access by the data access circuitry. The effect occurs in response to instruction bits associated with the data access circuitry. For example, the at least one addressable register is accessed, in response to one or more instruction bits associated with the data access circuitry, to select a type of register-access transaction. The data access circuitry accesses the register set, which may cause the side effect, and the configuration circuitry selectively disables the side effect. The data access circuitry may include a first data access circuit and a second data access circuit, each of which accesses the register set. In such examples, the apparatus further includes a multiplexer circuit coupled to each of the first data access circuit and the second data access circuit and to provide access to the register set.

The configuration circuit includes a plurality of interface circuits. The register set includes a plurality of subsets, each subset associated with at least one register and associated with the plurality of interface circuits. As a specific example, the configuration circuit includes a serial management interface circuit and another interface circuit that accesses the register set. The configuration circuit includes different options used for disabling the side effect. For example, the configuration circuitry disables the side effect by a control bit, control signal, and/or an operation instruction field of transaction frame.

In a number of related and specific embodiments, the apparatus further includes a monitor circuit to monitor the register set. The monitor circuit may monitor the register set and the apparatus includes a common interface to provide access to the register set, wherein the common interface is coupled to and shared by the monitor circuit and at least a portion of the data access circuitry. As a specific example, the monitor circuit may form part of the data access circuitry and/or an external controller circuit.

In specific embodiments, the apparatus is for use in a local area network (LAN) characterized by a plurality of network modules configured to convey data over a physical communication channel and with at least one of the network modules including a management communications bus for communication among a plurality of logic nodes via a communications protocol. The apparatus may include one of the plurality of logic nodes that includes the register set, the data access circuitry (or a portion thereof) and the configuration circuitry. In other embodiments, the apparatus includes a plurality of logic nodes, wherein the plurality of logic nodes includes a master logic node and a slave logic node, and the one node includes the slave logic node, the master logic node is further configured to operate in accordance with an industry standard that defines Ethernet-based LAN technology and to access the register set of the slave logic node and the communications protocol.

In another specific example embodiment, an apparatus includes a register set, a first data access circuit, a second data access circuit and configuration circuitry. The register set includes at least one addressable register to store data and manifests a side effect in response to the at least one addressable register being accessed. The first data access circuit accesses the register set and causes the side effect. The second data access circuit accesses the register set and causes another side effect. The configuration circuitry selectively disables one of the side effect and the other side effect. The above-described apparatus is for use in a LAN characterized by a plurality of network modules configured to convey data over a physical communication channel and with at least one of the network modules including a management communications bus for communication among a plurality of logic nodes via a communications protocol. One of the plurality of logic nodes includes the register set, at least one of the first and second data access circuits, and the configuration circuitry. The configuration circuitry disables one of the side effects and the other side effect by a control bit or a control signal.

The apparatus may further include a multiplexer circuit coupled to each of the first data access circuit and the second data access circuit and to provide selective access to the register set. In some specific embodiments, the configuration circuitry includes a serial management interface (SMI) circuit to access the register set responsive to the first data access circuit and another interface circuit to access the register set responsive to the second data access circuit. Additionally, the apparatus may include a monitor circuit. For example, the second data access circuit includes a monitor circuit to monitor the register set, and the other interface circuit is coupled to and shared by the monitor circuit and the second data access circuit. The first and second data access circuits are used to provide SMI transactions via the interface circuit and other transactions via the other interface circuit, and while the configuration circuit selectively disables one of the side effect and the other side effect.

The above-described apparatuses may be used to implement a variety of methods. An example method is used within a LAN characterized by a plurality of network modules configured to convey data over a physical communication channel and with at least one of the network modules including a management communications bus for communication among a plurality of logic nodes via a communications protocol. The method includes storing data on a register set including at least one addressable register, wherein a side effect is manifested in response to the at least one addressable register being accessed, accessing the register set using data access circuitry, and selectively disabling, using configuration circuitry, the side effect during the access. In various specific embodiments, a first data access circuit and a second data access circuit of the data access circuitry both access the register set, and the method further includes selectively disabling, via the configuration circuitry, the side effect using a control bit, a control signal and/or or an operation instruction field of transaction frame. For example, accessing the register set with the first data access circuit and the second data access circuit generates the side effect and another side effect (and/or different sets of side effects), and the selective disablement includes allowing the other side effect to occur.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving disabling side effects caused by register set accesses. In certain example embodiments, aspects of the present disclosure involve selectively disabling subsets of side effects due to multiple accesses of the register set by a plurality of register interfaces. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various local area networks (LANs) allow network devices of various manufacturers, such as network interface cards (NICs), hubs, bridges, routers, and switches, to communicate packetized data with each other in the LAN. The communications include access to memory, e.g., registers, in physical devices which may be in network modules connected to the LAN and as accessed via a register interface (e.g., via SMI as further described herein). The physical devices, sometimes referred to as "PHYs" may use a register map for configuration, control, and status readout of associated registers. The PHYs are located on or include logic nodes, and each logic node includes one or multiple PHYs. A register interface provides the functions of reading or writing register values to coupled registers. Some register interfaces, such as Serial Management Interface (SMI) or an Advanced Peripheral Bus (APB), cause side effects on certain register transactions. A side effect is a change of address or register values due to the register transaction that is in addition to the expected or intended results from the read or write access. Side effects may occur during read or write transactions, examples of which are further provided herein. Side effects can be generally defined when considering register transactions. Register transactions use an address, data, and one or more instruction bits to select the type of transaction, for example, to select read or write. A random-access register transaction may use multiple sub-transactions to convey all of the required information to complete the transaction. For example, for an interface using indirect addressing (as further described herein), the address and data may be transferred in different sub-transactions which include one or more instruction bits to differentiate between address or data transactions. If a read or write transaction for the selected address or data value or a combination of both, causes any additional address or register value change beyond what is expected from the basic read or write transaction, this is a side effect. Embodiments in accordance with the present disclosure are directed to apparatuses that selectively disable side effects caused by register accesses via an interface used to access the register. In specific embodiments, the selective ones of a set of side effects are disabled using a control bit (e.g., register bit) and/or a control signal.

In various embodiments, multiple interfaces access a register set which may cause a set of side effects and selective side effects of the set are disabled. As a specific example, PHY management registers exhibit side effects when accessed via the register interfaces. More specifically, some latch-high and latch-low register bits are used to capture specific events, which are clear-on-read. Accordingly, a register read transaction results in a read of the register value and clears such bits. In many embodiments, the clear-on-read side effect may be disabled. For debugging functionalities, side effects on read transactions may be disabled to monitor registers without changing the monitored register content. Embodiments are not limited to disabling the side effects of register transactions on PHY management registers and may be applied to any register interface to access a register set comprising side effects. The side effects may be disabled per access interface, as further described herein.

In a more specific example embodiment, an apparatus includes a register set, data access circuitry, and configuration circuitry, which may be located on one or more logic nodes. The register set includes at least one addressable register to store data and to manifest a side effect in response to the at least one addressable register being accessed. The side effect may include the stored data in the at least one addressable register being changed in response to a read-type access or a write-type access by the data access circuit. The side effect occurs in response to instruction bits associated with the data access circuitry and is caused by the specific behavior of the register. For example, the at least one addressable register is accessed, in response to one or more instruction bits associated with the data access circuitry, to select a type of register-access transaction. The data access circuitry accesses the register set, which may cause the side effect due to the specific behavior of the register, and the configuration circuitry selectively disables the side effect among a set of side effects. Additionally, the side effect may be on the address, such as an address increment as further described herein.

The data access circuitry may include a first data access circuit and a second data access circuit, each of which accesses the register set. In such examples, the apparatus further includes a multiplexer circuit coupled to each of the first data access circuit and the second data access circuit and to provide access to the register set. The configuration circuitry may include a plurality of interface circuits. As a specific example, the configuration circuitry includes a management interface circuit, and optionally another interface circuit, that accesses the register set. The configuration circuitry includes different options used for disabling the side effect. For example, the configuration circuitry disables the side effect by a control bit and/or a control signal.

In a number of related and specific embodiments, the apparatus further includes a monitor circuit to monitor the register set. The monitor circuit may monitor the register set. The apparatus may further include a common interface to provide access to the register set, wherein the common interface is coupled to and shared by the monitor circuit and a portion of the data access circuitry. As a specific example, the monitor circuit may form part of the data access circuitry and/or an external controller circuit. For example, the second data access circuit includes a monitor circuit to monitor the register set, and the other interface circuit is coupled to and shared by the monitor circuit and the second data access circuit. In such examples, the first and second data access circuits may provide SMI transactions via the first interface circuit and other transactions via the second interface circuit, and the configuration circuitry selectively disables one of the side effect and the other side effect. Although embodiments are not limited to concurrent access by the interface circuitry.

As may be appreciated, an implied side effect is generally implemented inside a register as an implied side effect is a default behavior. There are no additional transactions on the interface to accomplish side effects during default access with a side effect. A disable side effect signal is propagated with the transaction, by the configuration circuitry providing a bit or signal with the transaction, on the internal register interface to indicate to the register bank that the transaction is to be executed without the side effect. The disable side effect signal is derived from the register bit or a control (debug) signal depending on the source of the register transaction.

In specific embodiments, the apparatus is a network module that is part of a LAN. In many network modules, there are two types of logic nodes, a master logic node and slave logic node each coupled to a management communications bus. The master logic node manages access to the management communications bus and initiates the communications with the slave logic nodes over the management communications bus using a communications protocol, with each slave logic node including one or more PHYs or subsystems. The slave logic nodes have an internal bus to couple internal PHYs and/or subsystems and communicate over the management communications bus. The communications protocol may allow for different types of transactions communicated over the management communications bus. The different types of transactions have different commands used to access respective registers and are both compliant with the communications protocol. As an example, a first type of transaction involves direct addressing in which the register address is included in the management frame field for the transaction. A second type of transaction involves indirect addressing in which two commands per transaction are used to access an arbitrary register(s) (and, optionally, with the next register being ready with one command using an address increment), the first including the register address and the second including the data to write or read. As a more specific example, the transaction types include Clause 22 commands and Clause 45 commands which are both associated with the Institute of Electrical and Electronic Engineer (IEEE) 802.3. Generally, registers for the first type of transaction, such as Clause 22 registers, are separately or independently mapped from registers of the second type of transaction, such as Clause 45 registers.

The communications protocol can be in accordance with the IEEE 802.3 specification. The IEEE 802.3 specification defines two PHY register maps, one for each of Clause 22 and Clause 45. There is a register map defined in IEEE 802.3 Clause 22 for generations of Ethernet PHYs which contains up to thirty-two registers that are directly accessed via the management communications bus (e.g., management data input/output (MDIO)) (e.g., one of the thirty-two registers may be used for indirect access and does not involve a directly accessible register. There is another register map defined in IEEE 802.3 Clause 45 that is used for generations of Ethernet PHYs. This register map provides a larger register space than for Clause 22, which is sub-divided over multiple MDIO-managed devices (MMDs). Accessing the registers of these different Clauses requires different MDIO commands. For example, an MDIO access method for Clause 45 registers involves indirect addressing, which uses different MDIO commands than the access of Clause 22 registers which involves direct addressing. Both register maps include an IEEE-defined register address space and a vendor-specific register address space. Registers in the vendor-specific space can be assigned by the device manufacturer.

Although the above describes an application for Ethernet Serial Management Interface (SMI), embodiments can be applied to other applications where one or more interfaces are used to access a register set. The interfaces selectively disable ones of the side effects caused by the accesses to the register set. The side effects may be disabled per access interface. For PHYs, the register side effects are defined by the standard for SMI, which is the default behavior of the PHY registers. Other proprietary defined registers may also exhibit side effects. The access of the same registers via another access interface may have the same type of side effect. In various embodiments, side effects on SMI are disabled via an assigned register bit. The interface to the microcontroller has an additional auxiliary signal for disabling side-effects. Both can be used independently.

Figure 1A:
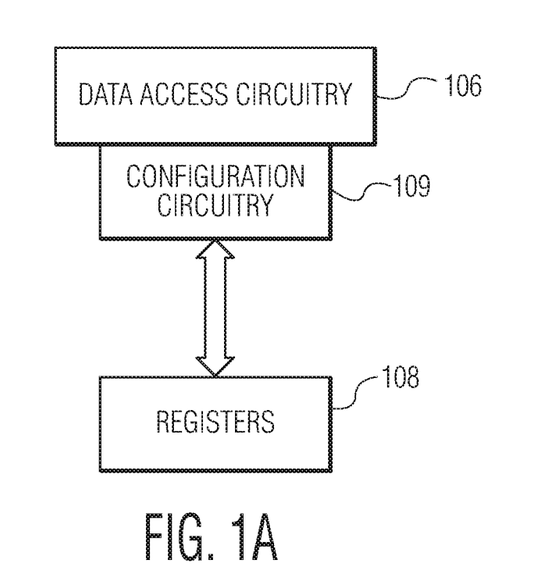
FIG. 1A-1B illustrate example apparatuses for disabling side effects, in accordance with the present disclosure.
Figure 1B:
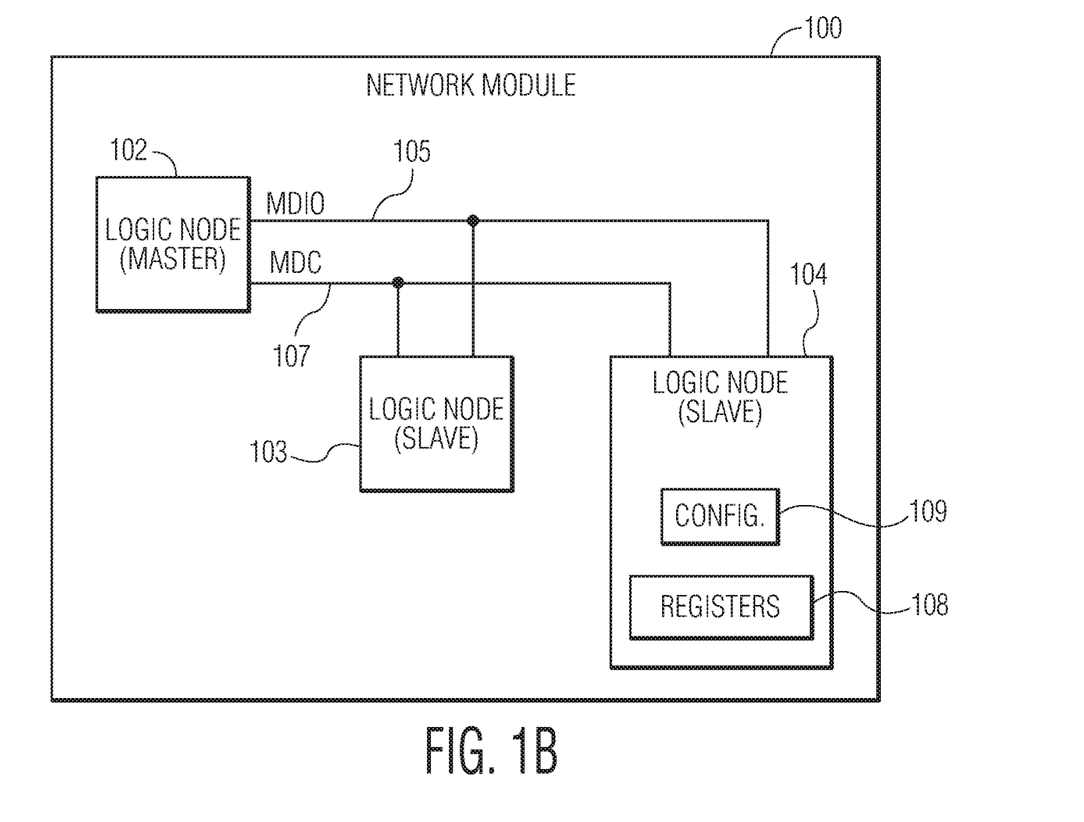

Turning now to the figures, FIGS. 1A-1B illustrate example apparatuses for disabling side effects, in accordance with the present disclosure. As shown by FIG. 1A, the apparatus includes data access circuitry 106 which causes side effects due to accesses to the set of registers 108. The side effects of a set of side effects may be selectively disabled using the configuration circuitry 109, as further described herein.

In specific embodiments, the data access circuitry 106 includes a plurality of data access circuits that access the register set 108 using different interface circuits which form the configuration circuitry 109. The registers of the register set 108, due to the behavior of the registers, may cause different types of side effects. The interface circuits may be used to selectively disable one of the side effects using a control bit and/or control signal. In some embodiments, the data access circuitry 106 or part thereof includes an external controller (such as a master logic node, which may manage a plurality of slave logic nodes (via internal interface functions of the slaves). The data access circuitry 106 may include an additional interface circuit, such as an embedded controller of a respective logic node.

Side effects may occur due to read or write transactions. For example, in IEEE-defined Ethernet registers, there are some bits used to latch occurrence of specific events which are specified as Clear-on-Read. When reading a register containing such as a bit, the last latched value of the bit is read, but additionally that register bit gets cleared and takes the actual value of the state or condition it monitors. Clear-on-read is also used for multi-bit register fields that track the minimum or maximum value of a parameter that occurred after the last time it was cleared. In a case in which the register field is cleared upon read and takes the momentary value of the parameter, this may be monitored. Furthermore, SMI multi-word reads may imply a reset of all involved registers after latching them for read-out by one or more follow-up read transactions. Reading such registers may have an impact on the respective register values. For non-invasive monitoring, read side-effects may be disabled.

Side effects on write transactions exist. For example, in the SMI register interface to manage PHYs, there are Self-Clearing control bits defined. Asserting such a bit initiates an action and the bit clears itself when the action completes. IEEE-defined PHY and MMD reset bits are examples of this. Side effects on write transactions may not be disabled, in various embodiments, as write transactions generally change register content, and side effects on the write transaction do not typically cause complications.

Side effects can be implied and requested side effects. An implied side effect implicitly comes with a transaction and is not selectable by the type of transaction. Examples of this for SMI are clear-on-read and self-clearing bits. Requested side effects are side effects which are explicitly requested by instruction bits in the transaction. An example of this for SMI is automatic address increment for some data transaction types. Side effects are typically used to reduce the number of transactions on the interface during normal operation, by implicitly executing an action that may otherwise involve one or more additional transactions. However, in a system where multiple functions and associated interfaces access the same registers, side effects are a complicating factor.

The apparatus includes the illustrated register set 108, the data access circuitry 106, and configuration circuitry 109 which may form part of or be integrated in one or more logic nodes of a network module. For example, the data access circuitry 106 may include circuit components on a slave logic node and a master logic node, with the register set 108 and configuration circuitry 109 being located on the slave logic node. The register set 108 includes at least one addressable register to store data and which may manifest a side effect in response to the at least one addressable register being accessed. In various specific embodiments, the register set 108 includes a plurality of registers, such that the register set 108 includes a plurality of subsets and each of the subset has at least one register and is associated with the configuration circuitry 109. For example, the apparatus may include a device having a plurality of slave logic nodes and each of the plurality of slave nodes includes one PHY and/or a plurality of PHYs or subsystem. In other embodiments, a device includes or is one slave logic node having a plurality of PHYs and/or subsystems. However embodiments are not so limited and various slave logic nodes may be single PHY devices. In any of the above-example embodiments, each of the PHYs is associated with a set of registers. Each of the PHYs may be integrated on one device or slave logic node having one SMI interface. The registers associated with the PHYs are accessible by the data access circuitry 106 and the configuration circuitry 109.

The data access circuitry 106 accesses the register set 108, which causes the side effect. In specific embodiments, the data access circuitry 106 accesses a register of the register set 108 using the configuration circuitry 109. For example, the at least one addressable register is accessed, in response to one or more instruction bits associated with the data access circuitry 106, to select a type of register-access transaction. The side effect occurs in response to the instruction bits associated with the data access circuitry 106. The side effect may include a change to the stored data in the at least one addressable register that is changed in response to a read-type access by the data access circuitry 106.

In various embodiments, the data access circuitry 106 includes more than one circuit. For example, the data access circuitry 106 includes a first data access circuit and a second data access circuit and each are configured to access the register set 108. In such embodiments, the apparatus further includes a multiplexer circuit coupled to each of the first data access circuit and the second data access circuit and to provide access to the register set 108. As a specific example, the data access circuitry 106 includes an SMI controller (internal to the master logic node and coupled to a SMI controller of a slave logic node) and another controller, such as an embedded microcontroller, and which both access the register set 108 using different interfaces and/or interface circuits, such as SMI and another interface (e.g., advanced peripheral bus (APB)). Each of the first and second data access circuits may cause side effects, and may both access the register set 108, such as at different times. The side effects caused by the accesses may be the same type of side effects and/or different types of side effects. Furthermore, a different subset of side effects may be disabled for accesses by the different data access circuits.

The configuration circuitry 109 is used by the data access circuitry 106 to access the registers 108 and may selective disable a side effect. The configuration circuitry 109 may include an SMI and/or another type of interface circuit. In specific embodiments, the configuration circuitry includes the SMI circuit (e.g., internal to a slave logic node) that accesses the register set 108. Similar to the data access circuitry 106, the configuration circuitry 109 may include multiple circuits, such as a plurality of interface circuits that are respectively used by the data access circuitry 106 to access the register set 108. As a specific example, a first data access circuit (e.g., an external SMI controller) is coupled to a first interface circuit (e.g., an internal SMI controller or interface circuit of the slave) to access the register set 108, and which may be in accordance with a communication protocol such as IEEE 802.3. A second data access circuit (e.g., embedded circuit internal to the slave) is coupled to a second interface circuit to access the register set 108, which may not be in accordance with the communications protocol. The first interface circuit, the second data access circuit and the second interface circuit may be internal to a slave logic node, and the first data access circuit is internal to a master logic node, although embodiments are not so limited.

The configuration circuitry 109 may use different options for disabling the side effect. For example, the configuration circuitry 109 selectively disables the side effect by a control bit and/or a control signal. In specific embodiments, the configuration circuitry 109 disables one of the side effect and the other side effect by a control bit (e.g., control or configuration register bit) or a control signal. As such, the configuration circuitry 109 may selectively disable a subset of the total side effects caused by the data access circuitry 106.

In various embodiments, the apparatus further includes a monitor circuit that monitors the register set 108, such as a circuit that provides debugging functions. The monitor circuit may form part of the data access circuitry 106 or may be separate therefrom. As further illustrated herein, a common interface may provide access to the register set 108 to the monitor circuit. More specifically, the common interface is coupled to and shared by the monitor circuit and a portion of the data access circuitry 106, such as forming part of the second data access circuit and used by the second data access circuit to provide debugging functionalities. However embodiments are not so limited, and debugging functionalities may be provided by an external controller, such as debugging a slave logic node using a master logic node. For debugging via an interface using indirect addressing of registers, the address pointers for the debug function are independent from the address pointers for the managing interface, as otherwise the address pointers for normal operation may be impacted by the debugger functionalities.

As used herein, disabling side effects is not limited to disabling all side effects that may be caused. The data access circuitry 106 may include multiple data access circuits that access the register set 108 using the configuration circuitry 109 which is or includes multiple register interfaces. The register interfaces may disable a subset of the side effects, such as, for example, implied side effects due to read transactions which cause issues for debugging applications. For other embodiments, another subset of the side effects may be disabled. The selected subset of disabled side effects may be different for different interfaces, depending on interface characteristics and the application. For example, the configuration circuitry 109 disables one of the side effect and the other side effect by a control bit (e.g., control or configuration register bit) or a control signal.

FIG. 1B illustrates a specific example apparatus for use in a LAN characterized by a plurality of network modules that convey data over a physical communication channel, such as media-independent interface connections connecting the network modules of the LAN. Network modules consisting of multiple devices may include a management communications bus for communicating among a plurality of logic nodes within the network module via a communications protocol. In some embodiments, one or more of the network modules of the LAN may not have a management communication bus, such as single device network modules. The communications protocol is compliant with an industry standard that defines an Ethernet-based LAN technology, such as IEEE 802.3. The apparatus, as shown by FIG. 1, may include or be associated with one of the plurality of network modules and/or one of the logic nodes 102, 103, 104.

As shown, the network module 100 includes a plurality of logic nodes 102, 103, 104 and a management communication bus 105, 107 for communication among the plurality of logic nodes 102, 103, 104 in response to communications sent over the management communications bus 105, 107 (e.g., which as may be appreciated may include addresses for the slaves and not the master logic nodes). The management communications bus 105, 107 includes two lines, a clock line and data line, respectively referred to as the management data clock (MDC) 107 and the management data input/output (MDIO) 105. MDC 107 provides a full-rate clock signal from the master logic node 102 to the slave logic nodes 103, 104 to drive and slice bits on MDIO 105 during frames. The clock signal may stop during idle. MDIO 105 is a bi-directional bus with a tri-state driver in each logic node 102, 103, 104 and restive pull-up on the bus. The management communications bus 105, 107 allows for addressing the logic nodes 102, 103, 104 by conveying addresses (e.g., port and register addresses) over the management communications bus 105, 107 using direct or indirect address, as further described herein. Various apparatus embodiments are directed to one of the logic nodes 102, 103, 104 (such as the master logic node 102 or one of the slave logic nodes 103, 104), more than one of the logic nodes (such as both the master logic node 102 and one of the slaves 103, 104), and/or the network module 100.

In a number of embodiments, two different types of logic nodes are connected to the management communications bus 105, 107, namely, slave logic nodes 103, 104 and a master logic node 102. The master logic node 102 generates the clock and initiates communications with the slave logic nodes 103, 104. The slave logic nodes 103, 104 receive the clock and respond when addressed by the master logic node 102. Although a single master logic node 102 and two slave logic nodes 103, 104 are illustrated, embodiments are not so limited and can include additional logic nodes or fewer logic nodes. The master logic node 102 is typically a microcontroller and is called a station management entity (STA) in the IEEE specification. The slave logic nodes 103, 104 are typically Ethernet PHYs, however SMI may also be used to manage other types of devices. In some network modules, such as with SMI, there is one master logic node and one more slave logic nodes. However, embodiments are not so limited and various types of network modules may include more than one master logic node and/or may not include master/slaves.

In a number of embodiments, the logic nodes 102, 103, 104 may be devices or form part of a device, such as a network-module device. A network-module device, as used herein, refers to or includes a device having MDIO connections to internal logic nodes (or a node) of the plurality of logic nodes of the network module. Each device may include one logic node or multiple logic nodes, with each logic node having one PHY, multiple PHYs and/or multiple subsystems. The slave logic nodes 103, 104 may be on separate device or devices from the master logic node 102, although embodiments are not so limited. For example, the master logic node 102 may be on the same device as one (or more) of the slave logic nodes 103, 104. Further, the slave logic nodes 103, 104 may be on the same device, and not separate devices.

One or more of the plurality of logic nodes 102, 103, 104 may include a PHY or multiple PHYs that connect to the data link layer, such as the medium access control (MAC) layer via a media independent interface (MII). A PHY may be a chip, which may include one or multiple PHYs. Larger chips may contain one or more PHY subsystems, each including one or more PHYs. A PHY includes or refers to an individual chip or circuit, as a part of a circuit assembly, or a subsystem (e.g., circuit) of a device (e.g., an SMI slave device having multiple PHYs, such as an IC). The PHYs are configured to implement physical layer functions. Each PHY has its own port address, and, in some embodiments, multiple PHYs are integrated into one device and/or a slave logic node (and/or, optionally, with multiple logic nodes on a device) having one shared SMI interface. Each PHY includes a physical coding sublayer (PCS), a physical media attachment layer (PMA) and/or a physical media dependent layer (PMD), as well as a media-dependent interface (MDI) that connects to the media (e.g., cable). The PMD is an interface between the PMA and the transmission medium through the MDI. The PMD receives serialized bits from the PMA and converts to the appropriate signals for the transmission medium (such as optical signals for a fiber optic line or electrical signals for a copper line), and vice versa. When transmitted to the PMA, the PCS encodes the data to be transmitted into the appropriate code group. When receiving the code groups from the PMA, the PCS decodes the code groups into the data format that can be understood and processed by upper layers. The MII carries signals between the physical layer and the data link layer, such as to a MAC controller. The MII may include a reduced media-independent interface (RMII), gigabit media independent interface (GMII), a reduced gigabit media independent interface (RGMII), serial gigabit media-independent interface (SGMII), quad serial gigabit media-independent interface (QSGMII), and 10-gigabit media-independent interface (XGMII), among others.

The logic nodes 102, 103, 104 (e.g., the PHYs internal to the logic nodes) include registers associated with different types of transactions. The different types of transactions are both compliant with the same communications protocol, and include different types of addressing and corresponding commands. For example, the first type of transaction includes direct addressing and the second type of transaction includes indirect addressing. For direct addressing, the address (e.g., the port address and register address) are included in the command with the instruction for the transaction. For indirect addressing, the address (e.g., the register address) is held in an intermediate location that is looked up for the instruction for the transaction. In specific embodiments, the direct addressing includes one command that has the address and the data. For indirect addressing, two commands are used, with the first including the address part (e.g., register address) and the second including the data part.

In accordance with various embodiments, one or more of the logic nodes 102, 103, 104 are used to selectively disable side effects, such as previously described in connection with FIG. 1A. For example, the slave logic node 104 includes at least a portion of the data access circuitry (e.g., a microcontroller embedded on the slave logic node 104), configuration circuitry 109, and a set of registers 108, as previously described. The data access circuitry may include a first data access circuit and a second data access circuit that access the register set 108, such as an SMI controller and an embedded microcontroller. The SMI controller is the master logic node 102 and which accesses the register set 108 via an internal-SMI controller to the slave logic node 104. The internal-SMI controller is a function internal to a slave logic node or to a device having multiple logic nodes, and that translates SMI transactions to internal register transactions. In such embodiments, the set of registers 108 may be accessed using two or more different types of register interfaces that form the configuration circuitry 109. Both the first and second data access circuits access the register set 108 and cause respective side effects, such as a side effect or set a side effects caused by the first data access circuit and another side effect or another set of side effects caused by the second data access circuit. The apparatus may further include a multiplexer circuit coupled to each of the first data access circuit and the second data access circuit and to provide selective access to the register set 108. As previously described, the other side effect may be the same type of side effect as the side effect or a different type of side effect and/or different sets of side effects.

The configuration circuitry 109 selectively disables one of the side effect and the other side effect caused by the first and second data access circuits. In a specific embodiments, the configuration circuitry 109 includes an SMI circuit to access the register set 108 responsive to the first data access circuit and another interface circuit to access the register set 108 responsive to the second data access circuit. The first and second data access circuits may provide SMI transactions via the first interface circuit and other transactions via the second interface circuit, and while the configuration circuitry 109 (e.g., SMI and another interface circuit) selectively disables one of the side effect and the other side effect and/or subsets of the side effects.

In some specific embodiments, monitor functions are provided by the data access circuitry and/or a monitor circuit. For example, the data access circuitry (such as one of the master logic node 102 and the second data access circuit internal to the slave logic node 104) includes a monitor circuit to monitor the register set 108. One of the interface circuits is coupled to and shared by the monitor circuit (e.g., debugger) and the second data access circuit internal to the slave logic node 104. In other embodiments, the master logic node 102 provides the debugging functionality, as further described herein.

Although SMI is defined by IEEE to access PHY management registers, embodiments are not limited to SMI and these management registers may be accessed via another interface. For example, reading PHY registers for debugging purposes may include a variety of different interfaces that provide access to the register set 108, and which may interfere with controller operation.

Disabling side effects can be accomplished with a register bit and/or an additional side-band control signal in the interface. For SMI, disabling side effects by a control or configuration register bit may be used, as this avoids extra wires. For embedded interfaces, an additional control signal may be used, however embodiments are not so limited. For newly defined serial register interfaces, the option to disable side effects may be included in the operation instruction field of transaction frames.

A register interface can support multiple side effect disabling options to allow for selective disablement of different side effect subsets. In various embodiments, a combination of multiple configuration bits and/or side-band signals are used to select the subset of side effects that is disabled.

In accordance with various embodiments, the registers that have side effects when accessed via a register interface may be accessible via multiple interfaces and disabling of side effects may be per interface. This allows for disabling of side effects for register accesses via at least one of these register interfaces, while keeping the side effects enabled for access via another register interface. An interface for which side effects are not disabled can be used by a controller, while the interface for which side effects are disabled can be used for monitoring and debugging purposes. Although various embodiments are described with respect to SMI and APB, embodiments are not so limited and can be applied to a variety of interfaces. Similarly, embodiments are not limited to PHY management registers and may include a variety of register sets.

Figure 2A:
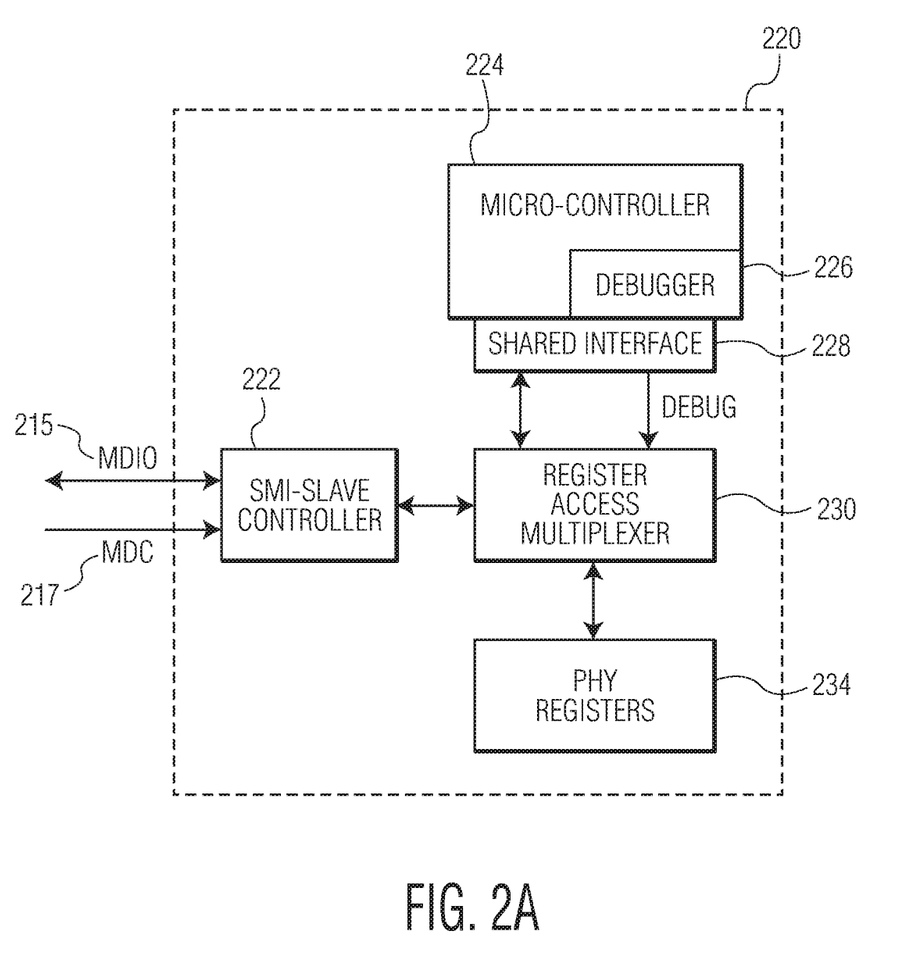
FIG. 2A-2B illustrate other example apparatuses for disabling side effects, in accordance with the present disclosure.
Figure 2B:
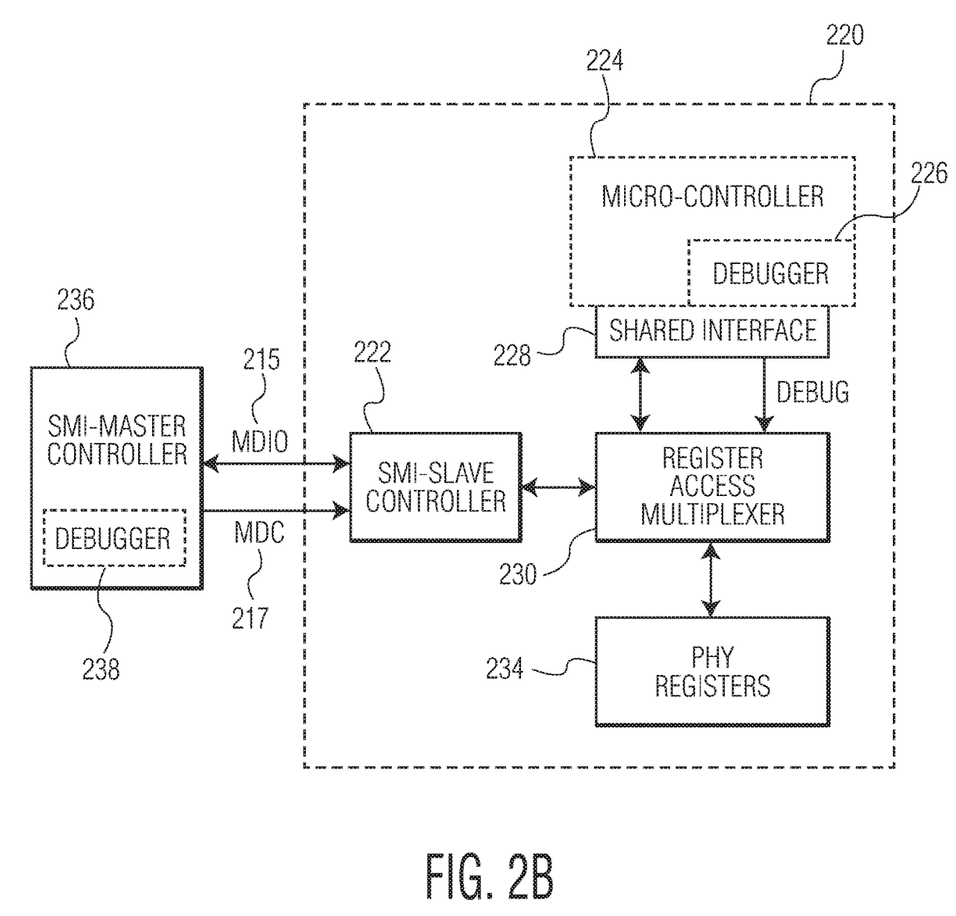

FIG. 2A-2B illustrate other example apparatuses for disabling side effects, in accordance with the present disclosure. The apparatus illustrated by FIGS. 2A-2B may include a slave logic node 220 having an SMI controller 222, sometimes herein referred to as "an internal-SMI controller," and an embedded microcontroller 224. The SMI controller 222 may include or be coupled to an SMI that provides the access to the register set 234 and which is in accordance with a communications protocol in response to (and/or as controlled by) an external SMI controller, such as the master logic node. The embedded microcontroller 224 may include or be coupled to another interface 228 that provides access to the register set 234 and which may not be in accordance with the communications protocol. The communications protocol may allow for transaction over the management communications bus 215, 217, such as Clause 22 and Clause 45 transactions in accordance with IEEE 802.3. As such, the master logic node and the embedded microcontroller 224 each provide access to the register set 234. As may be appreciated, embodiments are not limited to an SMI controller 222 and the slave logic node may include other types of managements controllers that may provide access to the register set 234 and/or provides the access responsive to an external controller.

Clause 22 transactions involve direct addressing for read and write operations. The frame fields in the data frames include:
  PRE: a preamble frame field which is "1" for thirty-two clock cycles
  ST: start-of-frame, which is fixed to "01"
  OP: operation code which identifies read or write operation (with 10 include read and 01 including write)
  PHYAD: a five bit (PHY) port address
  REGAD: a five bit register address
  TA: turn-around (hand over for read and filler for writes)
  DATA: sixteen bit register value (e.g., data).

Clause 45 transactions involve indirect addressing. Four example data frames include a first for an address part of a read or write transaction, a second for a read operation, a third for a write operation, and a fourth for post-read increment addressing in accordance with Clause 45 of IEEE 802.3. The frame fields in the data frame include:
  PRE: a preamble frame field which is "1" for thirty-two clock cycles
  ST: start-of-frame, which is fixed to "00"
  OP: operation code which identifies address, read or write operation (with 00 being write an address, 10 including read, 01 including write, and 11 including read and increment address)
  PRTAD: a five bit (PHY) port address
  DEVAD: a five bit MDIO-manage device (MMD) number
  DATA: sixteen bit address or register value (e.g., data)

The ST identifies whether the transaction is Clause 22 or Clause 45. For a Clause 45 transaction, the address is not include in the data/write commands. The address is stored per MMD and is set by a separate (address) command. The data read/write operations are directed to this address. The address space for Clause 45 is sixteen bit wide (e.g., 65536 registers).

More specifically, FIGS. 2A-2B illustrate an example logic node 220 having or associated with multiple data access circuits 224 (and master SMI controller 236 of FIG. 2B) and respective register interfaces 228 (and SMI by the illustrated internal SMI controller 222) used to access the set of registers 234. The set of registers 234 is accessible via multiple register interfaces, which may be different types of interfaces, and a mechanism for multiplexing transactions originating from multiple sources is provided by the apparatuses. In the example, the apparatus includes a register access multiplexer 230 that multiplexes the transactions, which may include or involve translation of transactions to a common interface format with the register set 234. In various embodiments, side effects may not be disabled for all interfaces, e.g., the other interface 228 and the SMI provided by the SMI controller 222, and not all the time, such that a mix of transactions with and without disabled side effects may occur on the interfaces to the register set 234. The interfaces around the register access multiplexer 230 may communicate for each respective communication transaction whether and which side effects are disabled. This can for example be accomplished by including side effect-disable control signals into the interfaces.

Disabling side effects due to read transactions for one of the interfaces may be useful for debugging purposes, as it allows for reading registers without changing register contents or influencing PHY operation. This allows for parallel operation of a controller (e.g., master logic node, as illustrated by the master SMI controller 236 of FIG. 2B) that manages a PHY, and a debugger function that monitors registers without impacting transaction results for the controller. As previously described, the debugger functionalities 226 may be provided by a monitor circuit which forms part of the embedded microcontroller 224 or is otherwise coupled to the embedded microcontroller 224. In other embodiments, the debugger functionalities are provided by a controller that is external to the slave logic node 220.

Various embodiments are directed to dynamically disabling side effects for accesses via a register interface enabling interleaving of transactions with side effects disabled and regular transactions as defined by a standard. An example of this is illustrated in FIG. 2A, where the embedded microcontroller 224 and the debugger 226 share the same interface 228 to access the register set 234. For transactions from the debugger 226, side effects are disabled by asserting the debug signal. For transactions by the embedded microcontroller 224, the debug signal is de-asserted, and transactions will be executed normally. Although embodiments are not so limited. Accessing the registers (such as via the interface 228) may not necessarily behave compliant with a standard when side effects are disabled.

Although the side effects of register transactions on PHY management registers are used as example in FIGS. 1B and 2A-2B, embodiments are not so limited and may be applied to any register interface to access a register set comprising side effects.

More specifically, FIG. 2A illustrates a specific example of managing registers of a PHY that is integrated on an IC, e.g., the slave logic node 220 having multiple PHYs or subsystems, which also comprises an embedded microcontroller 224, a debugger 226 functionality, and a SMI controller 222 that includes an SMI interface. This allows for multiple scenarios for PHY management with debugging facilities as the side effects for transactions from the debugger 226 may be disabled. As an example, the PHYs may be managed by an external controller (e.g., a master logic node having an SMI controller as further illustrated by FIG. 2B) via SMI, while the integrated debugger function 226 monitors these registers. The embedded microcontroller 224 may be managing the PHYs, while the integrated debugger function 226 is used to monitor the registers via the common or shared interface 228. Additionally, the embedded microcontroller 224 can manage the PHYs, while the registers are monitored via SMI by an external debugger function and using the master logic node and the internal SMI controller 222. As a debugger typically involves read transactions for monitoring, side effects on read transactions may be selectively disabled.

FIG. 2B illustrates both the slave logic node 220 including one or more PHYs, and the master logic node. As described above, the PHY may be managed by the master logic node which has or is an SMI controller 236, while the integrated debugger 226 function monitors the register set 234. Additionally and/or alternatively, the embedded microcontroller 224 can manage the PHYs, while the register set 234 is monitored via SMI by an external debugger function 238 and using the master logic node and the internal SMI controller 222 and via the management communications bus 215, 217.

In various embodiments, the associated PHY or PHYs of the slave logic node 220 illustrated by FIGS. 2A-2B may be managed by an external controller, e.g., the SMI master controller 236 and via the internal SMI controller 222, while the integrated debugger 226 monitors the set of registers 234. In other embodiments, the embedded microcontroller 224 manages the PHY or PHYs of the slave logic node 220, while the integrated debugger 226 monitors the set of registers 234. In further embodiments, the embedded microcontroller 224 manages the PHY or PHYs of the slave logic node 220, while the external debugger 238, e.g., the SMI master controller 236 and via the internal SMI controller 222, monitors the set of registers 234. In each of the above described embodiments, the interfaces (e.g., the common interface 228 and/or the SMI of the internal SMI controller 222) selectively disable subsets of the side effects caused by the accesses to the register set 234.

SMI includes the previously described two wire interface including a MDIO and MDC. The MDIO is a shared bus. The SMI further includes a tri-state driver that is present on all devices (e.g., each logic node that includes one or more PHYs). For example, in some embodiments, one of the slave logic nodes include multiple integrated PHYs or subsystems, each with a separate port address. The MDIO is passive resistive pull-up and all slave logic nodes listen to and only the addressed port responds. Addressed slave logic nodes drive the MDIO during read responses. The interface is connected to an internal-SMI controller used to control the communications to the different PHYs and/or registers. Typically, there is one SMI interface per device, and not separate SMI interface per sub-system. Devices may have multiple SMI functions on a single device and a single SMI interface may address multiple PHY ports. The embedded microcontroller is associated with another interface (e.g., APB) to access the register sets. In a particular example, the device (e.g., a slave logic node) has six PHYs and each of the six PHYs is associated with a set of registers.

The SMI and the other interface, e.g., APB, may selectively disable side effects caused by accesses to the register set by the respective interfaces. The disablement may occur via a control bit and/or control signal provided by the SMI or the APB. In number of embodiments, the SMI and other interface may concurrently access the register set, and one or more of the interfaces disables a respective side effect. In various embodiments, the other interface may be used to provide different types of functionalities, such as both managing the PHYs via regular APB transactions and debugging transactions. The other interface may selectively disable side effects from the debugging transactions and not for the regular APB transactions. In such embodiments, there may be separate sets of address pointers from the regular APB transactions and the debugging transactions. Additionally, there is a separate debug signal to distinguish the debug transactions from the regular APB transactions.

The different types of side effects may include self-clearing, latch-high, latch-low, and multi-word. Bits that are defined as self-clearing are command bits that perform a certain action. When a bit is defined as self-clearing and the bit is set, the corresponding action is done and the bit is autonomously reset at completion of the action. Some bits within MMD registers are defined as latching low (LL) or latching high (LH). When a bit is LH and the condition for the bit to be high occurs, the bit remains high until after is has been read via the management interface. Once such a read occurs, the bit assumes a value based on the current state of the condition it monitors. When a bit is LL and the condition for the bit to be low occurs, the bit remains low until after it has been read via the management interface. Once such a read occurs, the bit assumes a value based on the current state of the condition it monitors. Similarly, some multi-bit values (e.g. counters, SNR values) are defined as LL and LH, tracking the lowest or highest occurred value since the last read, which are cleared on read and assume the actual value of the parameter it monitors. In the case in which two registers together form a thirty-two bit counter, whenever the most significant 16-bit registers of the counter is read, the thirty-two bit counter value is latched into the register pair, the value being latched before the contents of the m most significant 16 bits are driven on the MDIO and the contents of both registers are cleared to all zeros. A subsequent read from the least significant 16-bit register returns the least significant 16 bits of the latched value, and does not change the contents of the register pair. Writing to these registers has no effect. Counters that adhere to this behavior are marked in their definition tables with the tag "MW."

For debug transactions, side effects on read transaction may be disabled. The disabled side effects may be disabled using a control signal, which eliminates clear-on-read for LH/LL bits and multi-bit fields, does not influence self-clearing (write) side effects, does not change an address increment, and eliminates clearing on multi-words without changing the latching (e.g., no high-word read of the master allowed between high lower word read pairs). Side effects on SMI may be disabled with a control bit.

Figure 3:
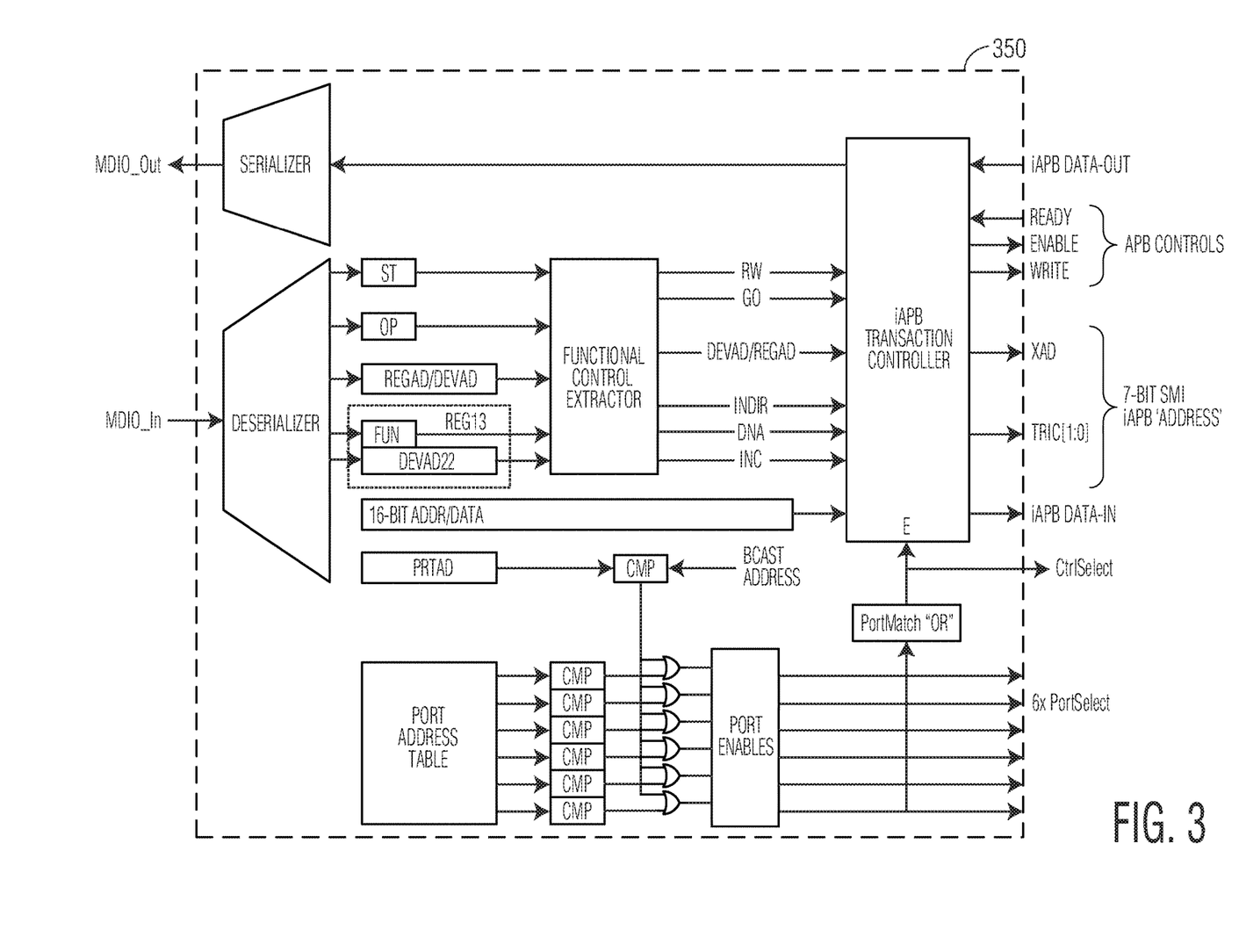
FIG. 3 illustrates an example interface controller of a logic node, in accordance with the present disclosure.

FIG. 3 illustrates an example interface controller of a logic node, in accordance with the present disclosure. More specifically, the interface controller includes an example SMI controller 350 that is internal to a slave logic node and/or a device having one or more PHYs.

The SMI controller 350 is coupled to or includes an interface (e.g., SMI). The SMI includes the previously described two wire interface including a MDIO and MDC and a tri-state driver that is present on all devices. The MDIO is passive resistive pull-up and all slave logic nodes listen to and only the addressed port responds. Addressed slave logic nodes (only), drive the MDIO during read responses. The interface is connected to an (internal) SMI controller 350 and used control the communications to different PHYs and/or registers. As may be appreciated, devices may have multiple SMI functions on a single device and a single SMI interface may address multiple PHY ports. In specific embodiments, there is one internal SMI controller 350 per slave logic node and/or per device.

The serial MDIO transaction is de-serialized and decomposed into the different fields of the frame. The port address of the transaction is compared with the port addresses in the port address table. If there is an address match detected the transaction proceeds via an internal interface to the registers. Note that the port address table may be located in the shared register space, which makes it accessible via SMI.

In various embodiments, MDIO_IN and MDIO_OUT of the SMI controller 350 is unidirectional and the MDIO pin is bidirectional. MDOE is an enable signal to select when the driver IO is driving the MDIO pin based on the MDO signal value. This MDOE signal gets only asserted in a slave logic node when it needs to drive the MDIO pin during a read transaction. Otherwise, the driver is tri-stated and the IO is used to monitor the incoming signal.

Figure 4:
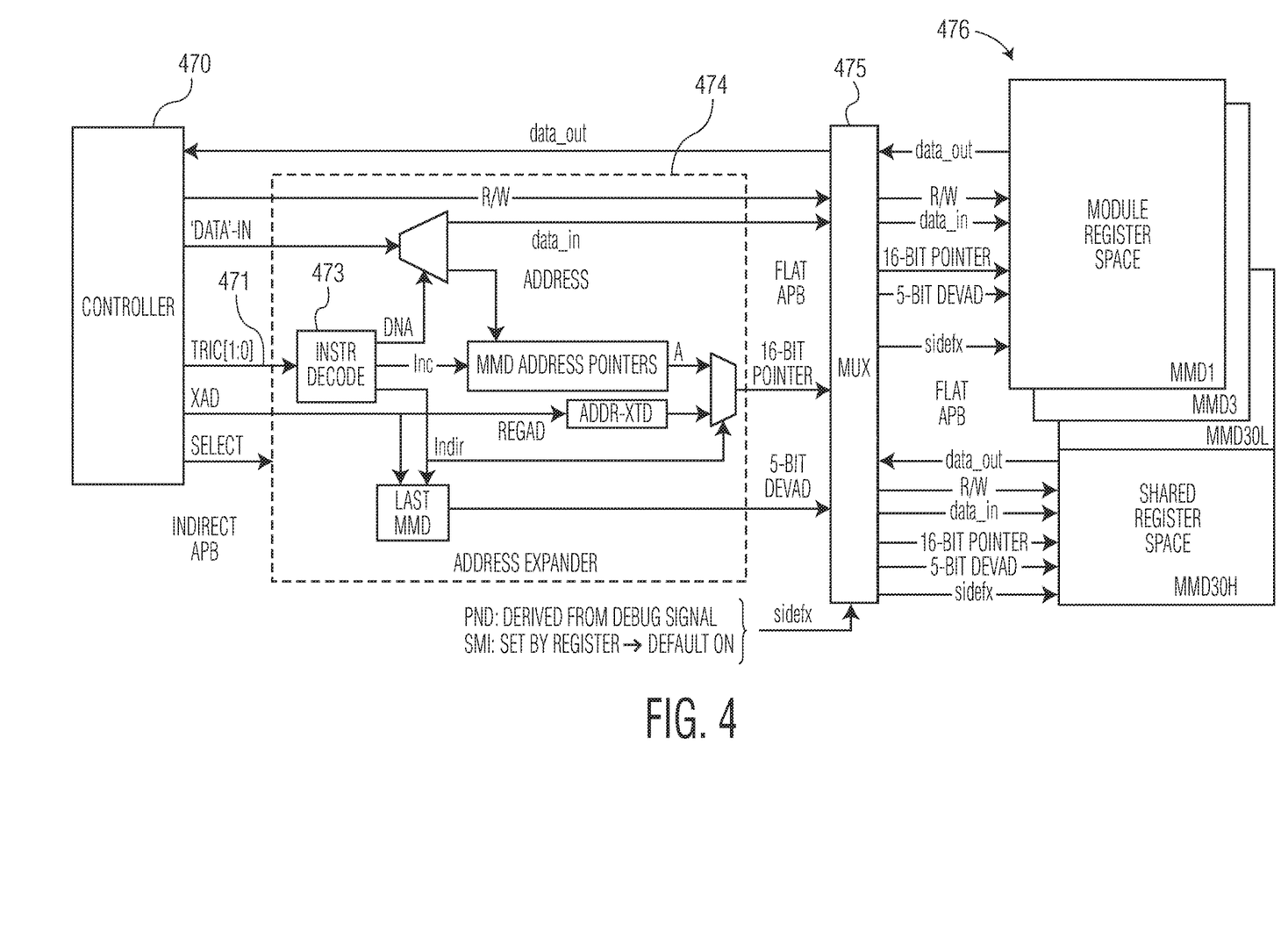
FIG. 4 illustrates example components of a logic node, in accordance with the present disclosure.

FIG. 4 illustrates example components of a logic node, in accordance with the present disclosure. The logic node may form part of a device, e.g., a network-module device, having one or more logic nodes, and each logic node including one or more PHYs and/or subsystems, as described above. In other embodiments, the logic node is a device that has one or more PHYs or subsystems. The logic node includes a management controller 470, such as an SMI controller. As previously described, an SMI controller is a function internal to the slave logic node that translates SMI transactions to internal register transactions. There may be one SMI controller per device (e.g., a network-module device) or per slave logic node, in some specific embodiments. However, embodiments are not limited to SMI, and the controller can be associated with other types of interfaces and/or with multiple interfaces, such as SMI and ABP and with access provided via a multiplexer 475. An address expander 474 may process transactions by identifying the location of the addressed register in the register space 476 in response to the management controller 470.

In specific embodiments, a Transaction Instruction Code (TRIC) 471 is used by the apparatus, such as by the management controller 470 of the slave logic node. TRIC is a code that conveys the different types of SMI transactions over the internal interface, including address, data indirect, data with address increment, and data direct. TRIC may be used on the internal APB between the management controller 470 (e.g., internal SMI controller) and the registers 476 and also on the other interfaces that may access the same registers 476 (e.g., such as the illustrated ABP and/or a port-number decoder (PND)). The management controller 470 may derive signals from a debug signal, and/or regular APB signal, in a specific example. As previously described, the debug signal may be provided by SMI (e.g., via the master logic node) or another interface, such as ABP, in various embodiments. The TRIC 471 is provided from the management controller 470 to the instruction decode circuit 473 that decodes the TRIC 471. The management controller 470 may include or be used as multiple interface (e.g., for both SMI and ABP, in the specific example), and which is also used to set the TRIC.

As previously described, for APB debugging, all side effects may be eliminated. Address increment is one of these side-effects. On SMI, there is typically no need to disable that side-effect as it is caused by a separate command that can be chosen to use or not. For register access via another interface, such as debugging using an embedded microcontroller, where the instruction code for transaction is mapped to the address space (e.g., TRIC bits), an address increment side-effect can become a problem and may need to be disabled.

As a specific example, the debugger sees PHYs as "11-bit address block." These 11-bits include the two instruction bits TRIC[1:0] and the TRIC bits contain an address increment option [1 1]. Further, reads in "11-bit address block" have side effect if TRIC=[11]. The debug select shall block address increment option with transactions with address increment are executed without increment, such as TRIC=[1 1]→[1 0]. Disabling "side effects" in SMI may not block address increment, with the address increment being orthogonal to the address space. The side effects may be selectively disabled by the interface circuits using a control signal or a control bit. The control signal or control bit is translated into a disable side effect signal (sidefx) For example, the control signal or control bit is provided with the transaction, by the configuration circuitry, and a disable side effect signal (side-effect) is derived from the control signal or register bit. The disable side effect signal indicates to the register bank that this transaction is to be executed without the side effect.

The above-described apparatuses may be used to implement a variety of methods. An example method is used within a LAN characterized by a plurality of network modules configured to convey data over a physical communication channel and with at least one of the network modules including a management communications bus for communication among a plurality of logic nodes via a communications protocol. The method includes storing data on a register set including at least one addressable register, wherein a side effect is manifested in response to the at least one addressable register being accessed, accessing the register set using data access circuitry, and selectively disabling, using configuration circuitry, the side effect during the access. In various specific embodiments, accessing the register set includes accessing the register set with a first data access circuit and a second data access circuit of the data access circuitry, and selectively disabling, via the configuration circuitry, the side effect using a control bit or a control signal. For example, the register set is accessed by both the first data access circuit and the second data access circuit, such as at different times (e.g., as interleaved by the multiplexer). The accesses generate different side effects (e.g., the side effect and another side effect). The selective disablement includes allowing the one or more of the side effects to occur and disable another of the side effects. The other side effect may be the same type of side effect as the side effect, a different type of side effect, and/or different sets of side effects.

Various embodiments are implemented in accordance with the underlying U.S. Patent Application (application Ser. No. 16/456,111 entitled "Apparatuses and Methods Involving First Type of Transaction Registers Mapped to Second Type of Transaction Addresses," filed on Jun. 28, 2019, which is fully incorporated herein by reference for its general and specific teachings. For instance, embodiments herein and/or in the provisional application may be combined in varying degrees (including wholly). As a specific example, the above-described apparatuses and/or methods may include first type of transaction registers that are mapped to the second type of transaction addresses, such as illustrated by FIGS. 2A-2B and 4. Embodiments discussed in the Patent Application are not intended, in any way, to be limiting to the overall technical disclosure, or to any part of the claimed disclosure unless specifically noted.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller and/or other circuit-type depictions (e.g., reference numerals 106, 109 and 222 of FIGS. 1 and 2A-2B depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches as described herein. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described herein used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the slave logic node 220 illustrated by FIGS. 2A-2B may be implemented in the apparatus illustrated by FIG. 1. Such modifications do not depart from the true spirit and scope of various aspects of the disclosure, including aspects set forth in the claims.

What is claimed is:

1. An apparatus, comprising:
a register set including at least one addressable register to store data and to manifest a side effect in response to the at least one addressable register being accessed;
data access circuitry to access the register set and cause the side effect; and
configuration circuitry to selectively disable the side effect.

2. The apparatus of claim 1, wherein the side effect includes the stored data in the at least one addressable register to be changed in response to a read-type access by the data access circuitry.

3. The apparatus of claim 1, wherein the at least one addressable register is accessed, in response to one or more instruction bits associated with the data access circuitry, to select a type of register-access transaction.

4. The apparatus of claim 1, wherein the configuration circuitry includes a serial management interface circuit to access the register set.

5. The apparatus of claim 1, wherein the side effect occurs in response to instruction bits associated with the data access circuitry.

6. The apparatus of claim 1, wherein the data access circuitry includes a first data access circuit and a second data access circuit, each to access the register set, the apparatus further including a multiplexer circuit coupled to each of the first data access circuit and the second data access circuit and to provide access to the register set.

7. The apparatus of claim 1, further including a monitor circuit to monitor the register set, wherein the configuration circuitry to disable the side effect by a control bit and/or a control signal.

8. The apparatus of claim 1, further including a monitor circuit to monitor the register set and a common interface to provide access to the register set, wherein the common interface is coupled to and shared by the monitor circuit and a portion of the data access circuitry.

9. The apparatus of claim 1, wherein the configuration circuitry includes different options used for disabling the side effect.

10. The apparatus of claim 1, wherein the configuration circuitry includes a plurality of interface circuits, wherein the register set includes a plurality of subsets, each subset associated with at least one register and associated with the plurality of interface circuits.

11. The apparatus of claim 1, wherein the apparatus is for a local area network characterized by a plurality of network modules configured to convey data over a physical communication channel and with at least one of the plurality of network modules including a management communications bus for communication among a plurality of logic nodes via a communications protocol, the apparatus comprising one of the plurality of logic nodes that includes the register set, at least a portion of the data access circuitry and the configuration circuitry.

12. The apparatus of claim 11, further including the plurality of logic nodes, wherein the plurality of logic nodes includes a master logic node and a slave logic node, and one node includes the slave logic node, the master logic node further configured to operate in accordance with an industry standard that defines Ethernet-based local area network (LAN) technology and to access the register set of the slave logic node and the communication protocol.

13. An apparatus for a local area network characterized by a plurality of network modules configured to convey data over a physical communication channel and with at least one of the network modules including a management communications bus for communication among a plurality of logic nodes via a communications protocol, the apparatus comprising at one or more of the plurality of logic nodes:
- a register set including at least one addressable register to store data and to manifest a side effect in response to the at least one addressable register being accessed;
- a first data access circuit to access the register set and cause the side effect;
- a second data access circuit to access the register set and cause another side effect; and
- configuration circuitry to selectively disable one of the side effect and the other side effect.

14. The apparatus of claim 13, wherein the configuration circuitry disables one of the side effect and the other side effect by a control bit, a control signal, or an operation instruction field of transaction frame.

15. The apparatus of claim 13, further including multiplexer circuit coupled to each of the first data access circuit and the second data access circuit and to provide selective access to the register set.

16. The apparatus of claim 13, wherein the configuration circuitry includes a serial management interface (SMI) circuit to access the register set responsive to the first data access circuit and another interface circuit to access the register set responsive to the second data access circuit.

17. The apparatus of claim 16, wherein the second data access circuit includes a monitor circuit to monitor the register set, and the other interface circuit is coupled to and shared by the monitor circuit and the second data access circuit, and the first and second data access circuits are configured and arranged to concurrently provide SMI transactions via the first interface circuit and other transactions via the second interface circuit, and while the configuration circuitry to selectively disables one of the side effect and the other side effect.

18. A method for use in a local area network characterized by a plurality of network modules configured to convey data over a physical communication channel and with at least one of the network modules including a management communications bus for communication among a plurality of logic nodes via a communications protocol, the method comprising:
- storing data on a register set including at least one addressable register, wherein a side effect is manifested in response to the at least one addressable register being accessed;
- accessing the register set using data access circuitry; and
- selectively disabling, using configuration circuitry, the side effect during the access.

19. The method of claim 18, wherein accessing the register set includes accessing the register set with a first data access circuit and a second data access circuit of the data access circuitry, and selectively disabling, via the configuration circuitry, the side effect using a control bit or a control signal.

20. The method of claim 19, wherein accessing the register set concurrently with the first data access circuit and the second data access circuit generates another side effect, and the selective disablement includes allowing the other side effect to occur.

* * * * *